United States Patent
Forrester et al.

(10) Patent No.: US 7,108,313 B2
(45) Date of Patent: Sep. 19, 2006

(54) TRIM ASSEMBLY AND METHOD OF MANUFACTURING SAME

(75) Inventors: David M. Forrester, Grand Blanc, MI (US); Thomas Jalosky, Allenton, MI (US); Jim Gruber, Alto, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 11/048,653

(22) Filed: Jan. 28, 2005

(65) Prior Publication Data

US 2006/0170242 A1    Aug. 3, 2006

(51) Int. Cl.
*B60J 5/00*    (2006.01)

(52) U.S. Cl. .................. 296/146.7; 296/39.1; 296/154

(58) Field of Classification Search ............... 296/191, 296/39.1, 154, 146.7
See application file for complete search history.

(56) References Cited

U.S. PATENT DOCUMENTS

| | | | |
|---|---|---|---|
| 6,321,495 B1 * | 11/2001 | Oami | 296/191 |
| 6,409,250 B1 * | 6/2002 | Schultheiss | 296/146.7 |
| 6,412,852 B1 | 7/2002 | Koa et al. | |
| 2001/0030444 A1 * | 10/2001 | Whitehead et al. | 296/146.7 |
| 2003/0001408 A1 * | 1/2003 | Hockenberry et al. | 296/146.7 |
| 2004/0169396 A1 * | 9/2004 | Dooley et al. | 296/146.7 |
| 2005/0184555 A1 * | 8/2005 | Williams et al. | 296/146.7 |
| 2005/0206192 A1 * | 9/2005 | Dry | 296/146.7 |
| 2006/0017306 A1 * | 1/2006 | Smith et al. | 296/146.7 |

FOREIGN PATENT DOCUMENTS

DE     3502056 A1 *    6/1986    ............. 296/146.7

* cited by examiner

*Primary Examiner*—Jason Morrow
(74) *Attorney, Agent, or Firm*—Honigman Miller Schwartz and Cohn LLP

(57) ABSTRACT

A trim assembly suitable for attachment to a door has an interior portion, wherein the interior portion includes at least one retaining mechanism, integrally formed thereon, and wherein the at least one retaining mechanism extends from the trim panel, and a seal having first and second sides, wherein the first side of the seal is adapted to bond to the door frame, and wherein the second side of the seal is capable of being removably retained by the interior portion of the trim panel by the at least one retaining mechanism.

9 Claims, 6 Drawing Sheets

TRIM ASSEMBLY AND METHOD OF MANUFACTURING SAME

BACKGROUND

It is known in the art to insert or attach sealing material between the interior of sheet metal that comprises a door frame of a vehicle and a trim panel connected thereto, such as, for example weather stripping, sound absorbing material and the like. Such material is typically designed to preliminarily attach to the trim panel using clip fasteners or other separate removable structures. Thus, the conventional design of attaching a door trim panel to a door frame may require additional fasteners that are an additional cost and require additional labor to assemble, and may also act as a nuisance when servicing the trim panel. In addition, such separate fasteners sometimes fall off into the bottom of the door and create an audible rattle within the passenger compartment. As such, a need exists for a method and apparatus to intermediately transfer sealing material from the trim panel to the door or sheet metal to which it affixes.

SUMMARY

The inventors of the present invention have recognized these and other problems associated with door assemblies. Specifically, a trim assembly that is suitable for attachment to a door frame is disclosed. The trim assembly comprises an interior portion, wherein the interior portion includes at least one retaining mechanism extending therefrom, and a seal having first and second sides, wherein the first side of the seal is adapted to bond to the door frame, and wherein the second side of the seal is capable of being removably retained by the interior portion of said trim panel by the at least one retaining mechanism.

A method of the invention comprises the steps of forming a trim panel, wherein said trim panel includes at least one projection having a base, and forming a retaining mechanism on an end of said projection.

Another method of the invention comprises the steps of forming a trim panel having at least retaining mechanism along a portion of said trim panel, positioning a seal along said trim panel, wherein said seal includes at least one aperture at a location on said seal that corresponds to a location of said at least one retaining mechanism, and fitting at least one of said at least one apertures of said seal over at least one of said corresponding at least one retaining mechanism.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout several views.

DETAILED DESCRIPTION

Figure 1:
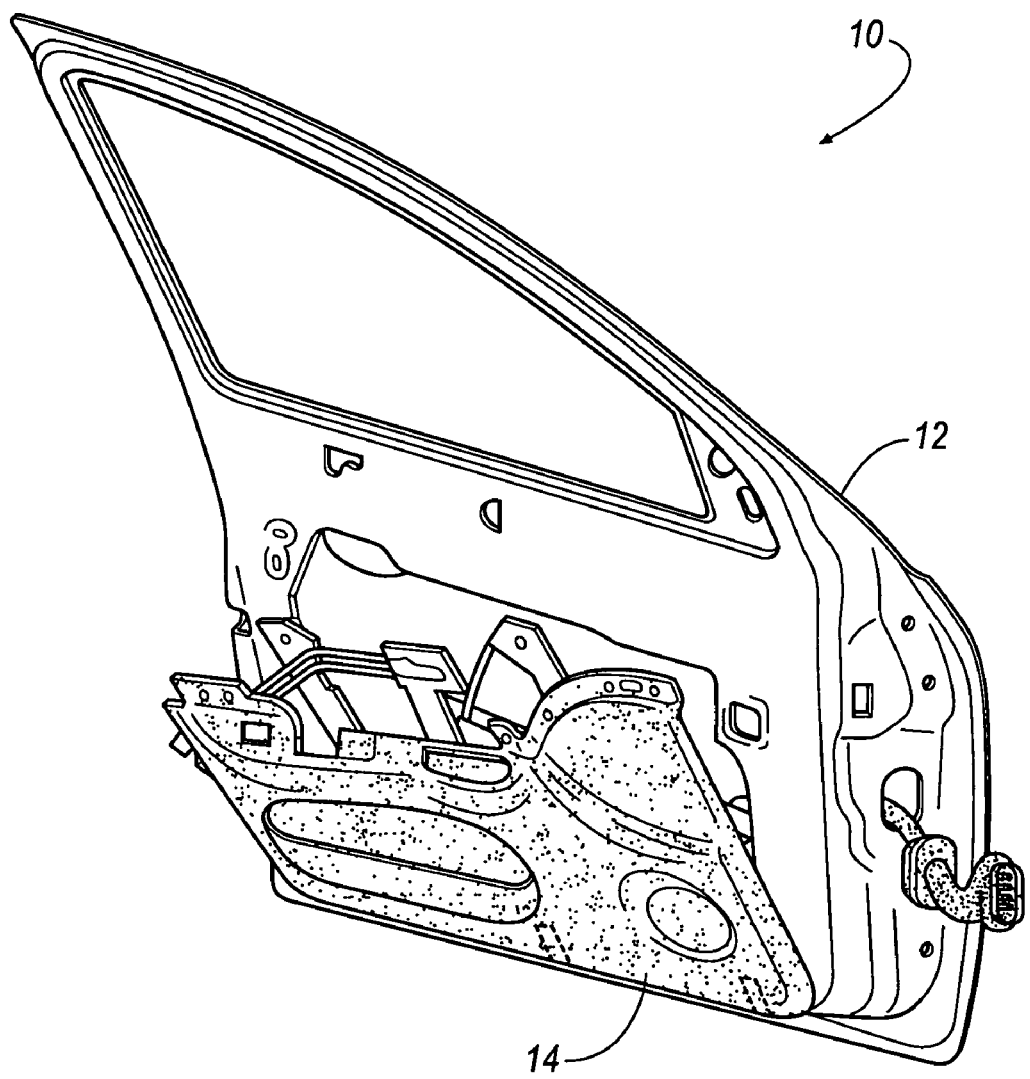
FIG. 1 is a perspective view of a door assembly in accordance with an embodiment of the invention.

Referring now to the drawings, wherein like numbers represent like elements, a door assembly 10 is generally shown according to an embodiment of the present invention.

Figure 2:
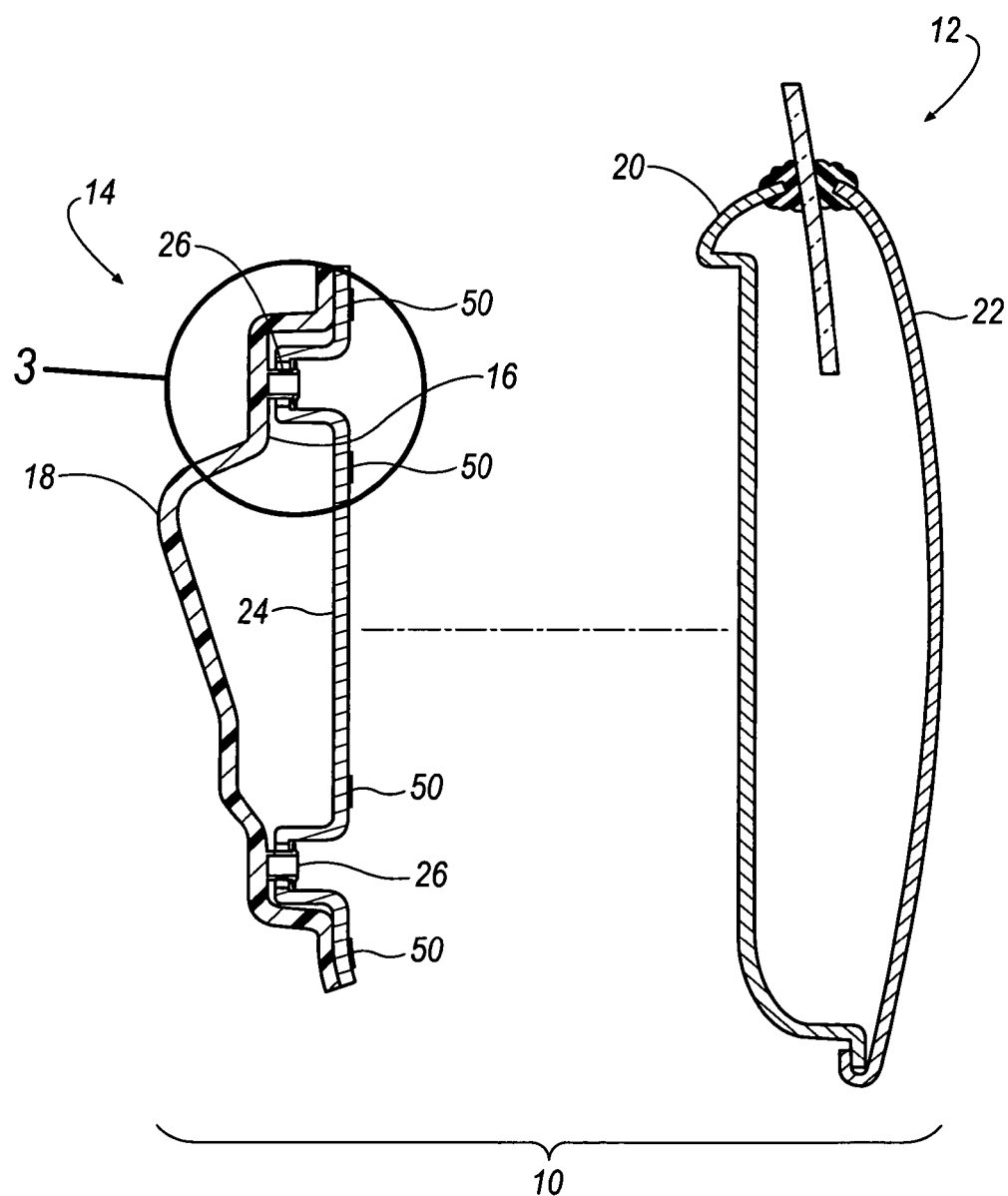
FIG. 2 is a cross-sectional view of the door assembly of FIG. 1, before assembly, in accordance with an embodiment of the invention.

Referring now to FIGS. 1 and 2, the door assembly 10 includes a first panel 12 and a second panel 14 and a seal 24 disposed therebetween. For purposes of convenience, the first panel 12 will be referred to herein as a door frame and the second panel 14 will be referred to herein as a trim panel. It should be noted, however, that the included illustrations of the disclosed method and apparatus may be applied in any environment having a first panel 12 and a second panel 14 wherein a seal is included, disposed, affixed, attached or the like therebetween.

The door frame 12 and the trim panel 14 attached thereto are conventionally known, and, therefore the individual components are generally represented throughout the various drawings. In this manner, the drawings are not intended to encompass all possible types or embodiments of such frames and panels, and, therefore, only represent such panels to the extent that they form a door frame 12 and corresponding trim panel 14. Thus, one of ordinary skill in the art will recognize that the present invention may be practiced with a door frame and a trim panel that are not exactly represented in the provided drawings. Additionally, various seals are known in the art and have been previously developed to protect contaminants, such as water, from entering into the interior of the door assembly, and it is therefore desirable to shield the trim panel 14 and the vehicle interior from the contaminants.

In an embodiment, the seal 24 is formed of a semi-rigid or flexible plastic sheet that comprises a water impervious thermoplastic, heat resistant material. The particular material may be selected by one of ordinary skill in the art as commercially available types of material suitable for this purpose are known. Similarly, other materials are known and used for seals, and may be adapted in accordance with the invention. One of ordinary skill in the art will recognize such materials when considering the present disclosure.

With reference now to FIG. 2, the trim panel 14 includes an interior portion 16 and an exterior portion 18. Likewise, the door frame 12 includes an interior portion 20 and an exterior portion 22. The interior portions 12, 16 of the trim panel 14 and the door frame 12 are arranged in a facing relationship and the seal 24 is illustrated therebetween. In a similar manner, the exterior portion 18 of the trim panel 14 likewise faces the interior of the vehicle and the exterior portion 22 of door panel 12 forms a portion of the exterior of the vehicle.

In one method of the invention, at least a portion of the interior portion of the trim panel 14 preliminarily retains the seal 24. The seal 24, as it becomes disposed between the trim panel 14 and the door frame 12 provides, for example among other functions, a shield against externalities from entering the door assembly 10 and may also provide a dampening mechanism for sound and other internal features that may occur within the door assembly 10. In an embodiment, the seal 24 provides insulation between the door assembly 10 and externalities With continued reference to FIG. 2, the interior portion 16 of the trim panel 14 includes at least one retaining mechanism 26 along at least a portion of trim panel 14. The retaining mechanism 26 removably retains the seal 24. This feature may be beneficial for the transportation and installation of the trim panel 14 and the seal 24 as a package. That is, until the trim panel 14 and the seal 24 are attached to the door frame 12, the retaining mechanism 26 carries or transports the seal 24. The trim panel 14 and the seal 24 are then combined with the door frame 12 and form the door assembly 10. The details of the retaining mechanism 26 and the subsequent attachment to the door frame 12 will be further discussed herein.

For purposes of illustration, FIG. 2 depicts two retaining mechanisms 26 arranged at various points along the trim panel 14. However, although two retaining mechanisms 26 are illustrated at various points or positions along trim panel 14, the invention is not to be limited by the placement or number of illustrated retaining mechanisms 26. That is, the invention contemplates any combination of the trim panel 14 having the at least one retaining mechanism 26, such as the one herein described, for retaining the seal 24 during the assembly process.

Figure 3:
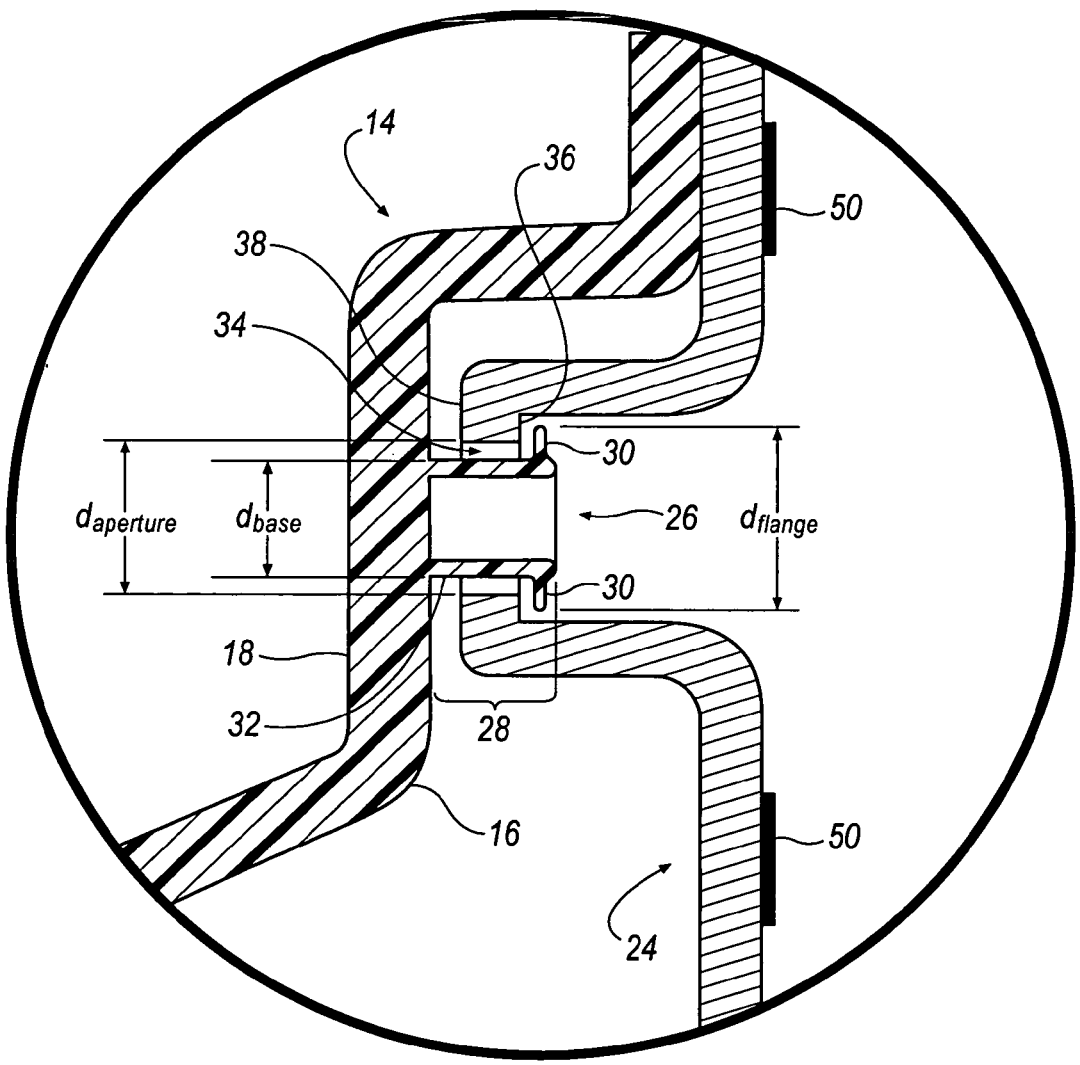
FIG. 3 is an enlarged view of a section of the trim panel of FIG. 1 in accordance with an embodiment of the invention.
Figure 4:
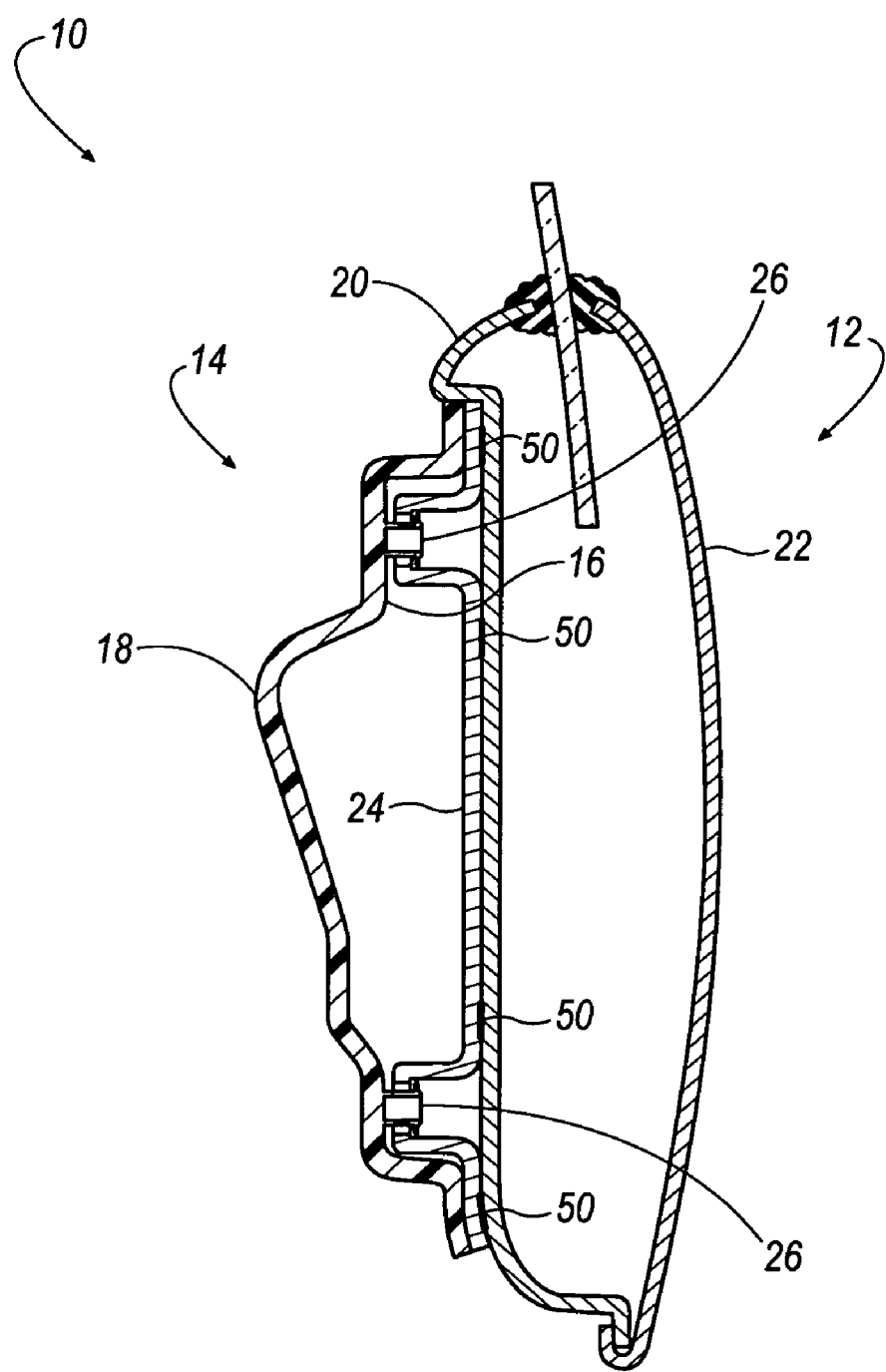
FIG. 4 is a cross-sectional view of the door assembly of FIG. 1, after assembly, in accordance with an embodiment of the invention.

Referring now to FIG. 3, the trim panel 14 includes the retaining mechanism 26 formed therein or thereon, and the seal 24 retained by the retaining mechanism 26. The retaining mechanism 26 acts as a boss that extends from a portion of the trim panel 14. The retaining mechanism 26 forms a mushroom-like structure that has a flange 30 or the like extending from a base 32.

In the illustrated embodiment, the retaining mechanism 26 is formed during an injection molding process that forms the trim panel 14. The retaining mechanism 26 is initially formed with only the base 32 extending substantially perpendicularly from the trim panel 14. Next, the flange 30 is formed on the retaining mechanism 26 using a heat staking process by applying heat and pressure to the end of the retaining mechanism 26. Although a heat staking process is disclosed, it is but one example to form the retaining mechanism. It will be appreciated that other suitable mechanisms exist to form the retaining mechanism 26 with the flanges 26. Thus, among other possibilities, the retaining mechanism 26 could be formed by any combination of molding, heat staking, or the like. The heat staking process may be performed before the seal 24 is connected to the trim panel 14. It should also be noted, that the heat staking process could instead be performed after the seal 24 is connected to the trim panel 14.

The seal 24 defines at least one aperture 34 at a location thereon that corresponds to a location of the retaining mechanism 26 extending from the trim panel 14. As FIG. 3 illustrates, a diameter of the aperture 24 ($d_{seal}$) is larger then a diameter of the base 32 ($d_{base}$) of the retaining mechanism 26, but smaller then a diameter of the flange 30 ($d_{flange}$). In one embodiment, the seal 24 is a panel structure that substantially extends entirely between the trim panel 14 and the door frame 12. However, other formatives of the seal 24 are additionally contemplated in accordance with the invention. For example, the seal 24 could instead be a strip designed to run substantially along the perimeter between the trim panel 14 and the door frame 12.

In the illustrated embodiment, the aperture 34 of the seal 24 fits over retaining mechanism 26. The seal 24 circumscribes or surrounds the base 32 of the retaining mechanism 26 to the extent that the seal 24 remains removably retained by the trim panel 14. Thus, the retaining mechanism 26 and thereby the trim panel 14 provide a support structure for the seal 22 until the seal 24 is affixed to the inner portion 20 of the door frame 12.

In the illustrated embodiment, the seal 24 includes a first surface 36 and a second surface 38. The first surface 36 of the seal 24 includes an adhesive or bonding material 50 to adhere or bond the seal 24 to the interior portion 20 of the door frame 12. In an embodiment, a protectorate paper or the like (not shown) may be provided to cover or shield the adhesive material 50 to preserve the adhesive properties until the protectorate is removed. Other protectorate mechanisms are additionally known that may protect the adhesion properties of this structure which will be recognized when considering the present disclosure.

The adhesive material forms a bond with the interior portion 22 of the door frame 12 to affix the seal 24 to the door frame 12. In the illustrated embodiment, a first retaining force exists between the seal 24 and the door frame 12, and a second retaining force exists between the seal 24 and the retaining mechanism 26. The first retaining force is configured to be greater then the second retaining force such that as door assembly 10 is disassembled, the removal force necessary to break the second retaining force is less than the removal force necessary to break the first retaining force. The disassembly, therefore, allows the trim panel 14 to be removed from the seal 24 and the door frame 12. This is in part due to an elasticity of the seal 24 and the lengths of $d_{seal}$, $d_{base}$, and $d_{flange}$ allowing the aperture 34 of seal 24 to pass over the flange 30 of the retaining mechanism 26. In other words, in the event that it becomes necessary to enter the interior of the door assembly 10, for example among others, to provide access for service technicians or the like to have access to the door assembly 10, or other various activities that require that trim panel 14 be removed or separated from door frame 12, seal 24 will remain affixed to interior portion 22 of door frame 12, and thereby allow the retaining mechanism 26 of the trim panel 14 to exit the aperture 30 of the seal 24. After servicing the door assembly 10, if desired, the retaining mechanism 26 and the aperture 34 of the seal may be reattached. However, it is not a necessary feature that the seal 24 and the retaining mechanism 26 become reattached.

It is additionally noted that various adhering mechanisms or compounds will become readily apparent to one of ordinary skill in the art in combination with the present disclosure.

Figure 5:
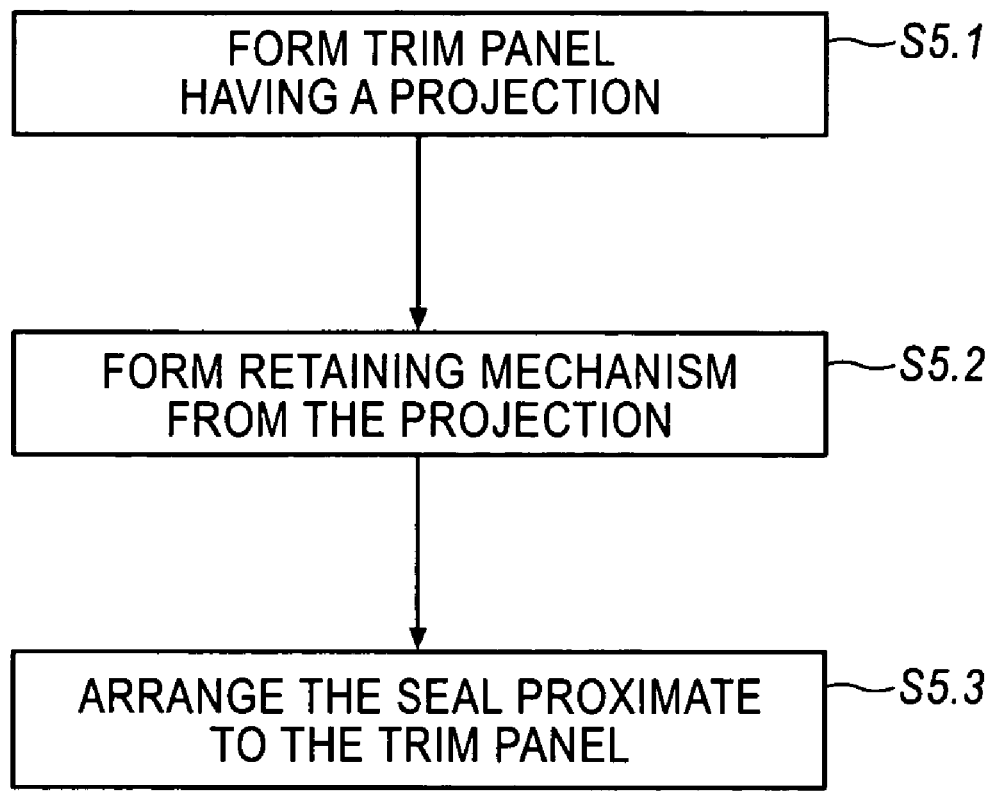
FIG. 5 is a flowchart according to a method of the invention.

Referring now to FIG. 5, a method for manufacturing a trim assembly will now be described in accordance with an embodiment of the invention. The trim panel 14 is formed and includes at least one projection having abase 32 in step S5.1. A retaining mechanism 26 is formed from the projection in step S5.2. A seal 24 is arranged proximate to the trim panel in step S5.3. The seal 24 includes at least one aperture 34 that corresponds with the projection of the trim panel 14, and the aperture 34 extends around the base 32 of the projection. It should be noted that the step S5.2 for forming the retaining mechanism 26 could be performed either before, or after, step S5.3 of arranging the seal 24.

In an embodiment, therefore, the attachment of the complete door assembly 10 is accomplished by pre-assembling the trim panel 14 with the seal 24 to thereby form a trim assembly. It is noted that the trim assembly may also include other various elements that are generally pre-assembled with conventional door trim assemblies. In this manner, the door assembly 10 may be rapidly assembled by combining the trim assembly with the door frame 12 by simply adding pressure against each the door frame 12 and the trim assembly so that the adhesive 50 on the seal 24 engages and secures the seal 24 to the door frame 12. This permits fast assembly and eliminates the manual positioning and fastening of seal 24 in its precisely required location within the door frame 12. That is, this arrangement automatically positions the seal 12 for assembly without necessitating separate measurements or manual attempts to locate the correct location.

Figure 6:
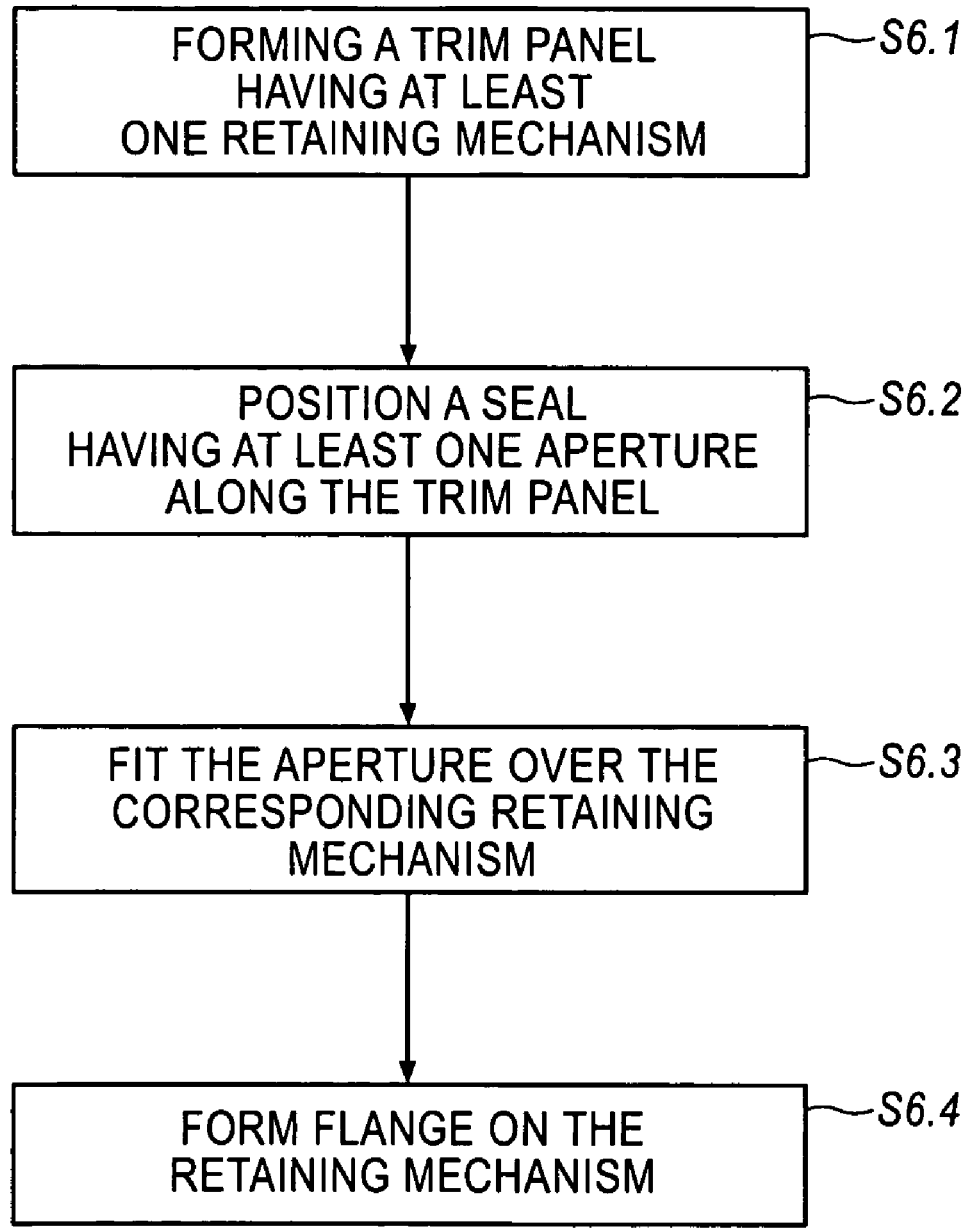
FIG. 6 is another flowchart according to another method of the invention.

Referring now to FIG. 6, another method of manufacturing a trim assembly is described in accordance with an embodiment of the invention. The trim panel 14 is formed having at least one retaining mechanism 26 along a portion of the trim panel 14 in step S6.1. A seal 24 is positioned along the trim panel 14 in step S6.2. The seal 24 includes at least one aperture 34 at a location on the seal 24 that corresponds to a location of the retaining mechanism 26 on the trim panel 14. The aperture 34 of the seal 24 is fit over the corresponding retaining mechanism 26 in step S6.3. A flange 30 is formed on the retaining mechanism 26 in step S6.4. It is noted that the flange forming step of S6.4 could instead precede the seal positioning step of S6.2 and the aperture fitting step of S6.3.

It should be emphasized that the above-described embodiments of the present invention, particularly, any "preferred" embodiments, are only possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A trim assembly for attachment to a door frame, comprising:
   a trim panel having an interior portion, wherein said interior portion includes at least one retaining mechanism, integrally formed in one piece thereon, and wherein said at least one retaining mechanism extends from said trim panel;
   a seal having first and second sides, wherein said first side of said seal is adapted to bond to the door frame, and wherein said second side of said seal is capable of being removably retained by the interior portion of said trim panel by the at least one retaining mechanism,
   and wherein said bond between said first side of said seal and the door frame has a first retaining force and the relationship between at least one aperture of said seal and said at least one retaining mechanism has a second retaining force, wherein said first retaining forcing is greater than said second retaining force, and further wherein said at least one retaining mechanism remains integral with said trim panel upon removal of the trim panel from said seal and the door frame.

2. The trim assembly according to claim 1, wherein said seal defines at least one aperture, each of said at least one aperture corresponding to one of said at least one retaining mechanism.

3. The trim assembly according to claim 2, wherein said aperture is adapted to receive said at least one corresponding retaining mechanism.

4. The trim assembly according to claim 1, wherein said at least one retaining mechanism includes a base and a flange extending therefrom.

5. The trim assembly according to claim 4, wherein each of said at least one aperture is adapted to circumscribe said base of each of said at least one retaining mechanism.

6. The trim assembly according to claim 1, wherein said at least one retaining mechanism is formed in said interior portion.

7. The trim assembly according to claim 1, wherein said at least one retaining mechanism is formed in said interior portion using a heat staking process.

8. The trim assembly according to claim 1, wherein first side of said seal includes adhesive such that said adhesive is adapted to bond said seal to said door frame.

9. The trim assembly according to claim 1, wherein said interior portion of said panel includes a perimeter, and at least two of said retaining mechanisms are included along said perimeter.

* * * * *

UNITED STATES PATENT AND TRADEMARK OFFICE
CERTIFICATE OF CORRECTION

| | | |
|---|---|---|
| PATENT NO. | : 7,108,313 B2 | Page 1 of 1 |
| APPLICATION NO. | : 11/048653 | |
| DATED | : September 19, 2006 | |
| INVENTOR(S) | : David M. Forrester et al. | |

It is certified that error appears in the above-identified patent and that said Letters Patent is hereby corrected as shown below:

On the title page item (57), Abstract, Line 1, add the word --frame-- after the phrase "to a door."

Signed and Sealed this

Twenty-sixth Day of December, 2006

JON W. DUDAS
*Director of the United States Patent and Trademark Office*